S. J. SIBLEY.
AUTOMOBILE SIGNAL LAMP.
APPLICATION FILED AUG. 18, 1919.
1,361,106.
Patented Dec. 7, 1920.
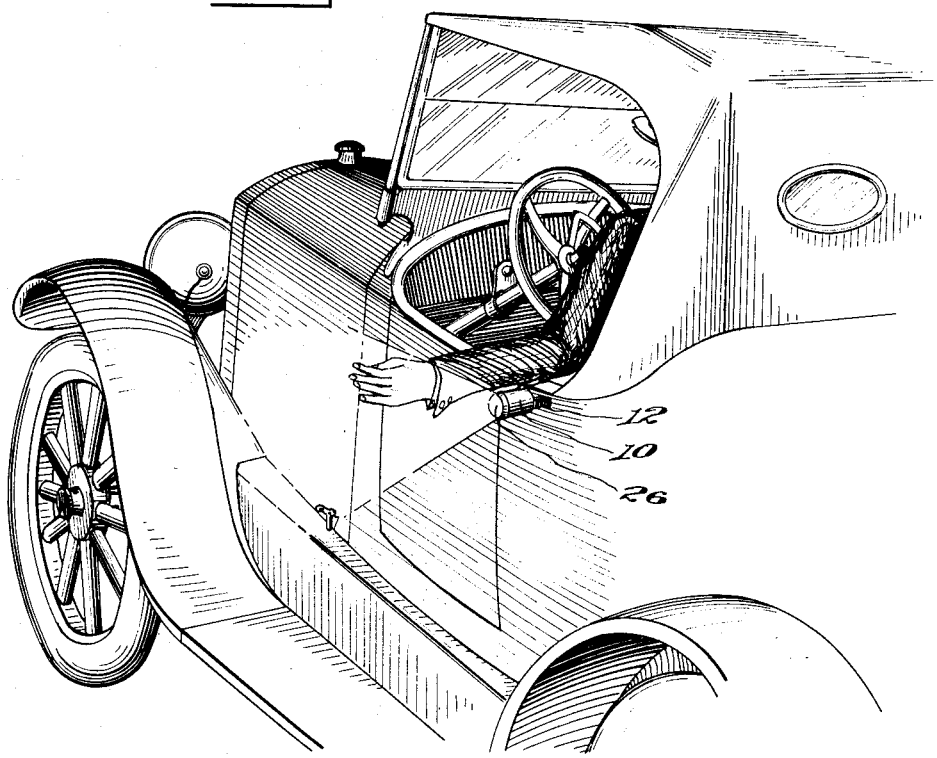
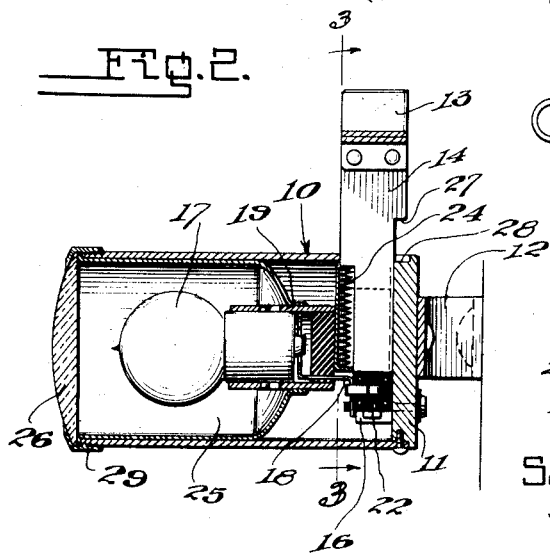
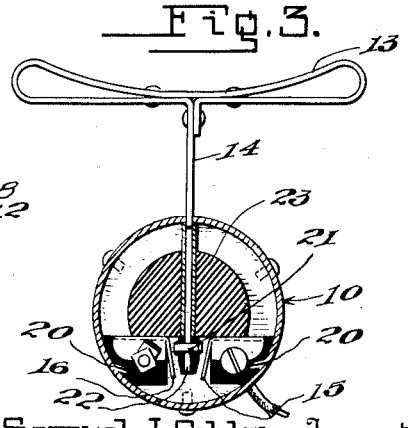
Samuel J. Sibley, Inventor

UNITED STATES PATENT OFFICE.

SAMUEL JAMES SIBLEY, OF MEMPHIS, TENNESSEE.

AUTOMOBILE SIGNAL-LAMP.

1,361,106.  Specification of Letters Patent.  Patented Dec. 7, 1920.

Application filed August 18, 1919. Serial No. 318,268.

*To all whom it may concern:*

Be it known that I, SAMUEL J. SIBLEY, a citizen of the United States, residing at Memphis, in the county of Shelby and State of Tennessee, have invented certain new and useful Improvements in Automobile Signal-Lamps, of which the following is a specification.

This invention relates to a signal lamp, for use upon automobiles or analogous motor vehicles, and an object of the invention is to provide a signal lamp structure adapted for attachment to the side of a body of a motor vehicle, and including a circuit closer for controlling the passage of an electric circuit through the bulb of the lamp structure, which circuit closer carries an arm rest upon which the operator's arm is adapted to rest, when he extends his arm laterally from the vehicle for indicating the direction about to be taken. or for other signaling purposes, and which circuit closer will operate under weight of the driver's arm, for closing a circuit to energize the lamp for illuminating the driver's hand to attract attention thereto when driving at night, thereby materially decreasing the liability of accidents due to the failure of following vehicles to properly see the signals of a preceding vehicle.

Other objects of the invention will appear in the following detailed description taken in connection with the accompanying drawings. forming a part of this specification and in which drawings:

Figure 1 is a fragmentary perspective view of an automobile illustrating the improved signal lamp applied thereto.

Fig. 2 is a longitudinal central section through the signal lamp, and

Fig. 3 is a section taken on the line 3—3 of Fig. 2.

Referring more particularly to the drawings, wherein like characters indicate like parts throughout the several views, the main housing 10 of the signal lamp is cylindrical in shape and its inner end is attached to a suitable carrying plate 11. The carrying plate 11 has an attaching bar 12 attached to its outer surface by means of which the signal lamp is attached to one side of the motor vehicle as clearly shown in Fig. 1 of the drawings, so that when the driver of the vehicle extends his arm laterally, the forearm will rest upon the saddle 13, of the circuit closer 14, for depressing the member under weight of the driver's arm for bridging the contacts 15 and 16 to permit the closing of a circuit through the incandescent lamp bulb 17. The bridging of the contacts 15 and 16 controls the passing of an electric current through the central electrode or terminal of the bulb 17 through the medium of a conducting strip 18, while the circuit is completed through the bulb through the medium of the socket 19 as is ordinary in the construction of lamp bulbs of this nature. The contacts 15 and 16 are preferably in the form of spring tongues and they are each carried by a suitable block 20 of insulation, attached to the inner surface of the supporting plate 11 of the signal lamp structure and they normally angle out toward each other as clearly shown in Fig. 3 so as to form a firm contact with the conducting pin 21 which extends transversely through the head 22 of the circuit closer 14. The circuit closer 14 extends slidably through a suitable block 23 of insulation, and it is normally held in an upward position out of engagement with the contacts 15 and 16 by an expansible spiral spring 24. A suitable reflector 25 is mounted about the lamp 17 for reflecting the light rays therefrom through the lens 26, which is carried at the outer end of the housing 10 for the purpose of magnifying the light rays, to thoroughly illuminate the hand of the driver of the vehicle as clearly illustrated in Fig. 1 of the drawings, thereby rendering the driver's hand clearly visible, to vehicles following the one upon which the signal lamp is mounted and, materially eliminating accidents which would be due to the driver of the following vehicles being unable to properly see and interpret the signals of the foremost or preceding vehicles.

The circuit closer 14 has a shoulder 27 formed upon its rear edge which is adapted to engage against a shoulder 28 formed upon the plate 11 for limiting the downward movement of the circuit closer and also for forming a positive support therefor under depression thereof by the weight of the arm of the driver of the vehicle.

The lens 26 is preferably detachably connected to the housing 10 by means of a cap 29, so that it may be removed if so desired, Changes in details may be made without departing from the spirit of this invention, but;

I claim:

1. A device for illuminating the hand of a vehicle operator when signaling, comprising a lamp, means for securing the lamp to the side of a vehicle with the lamp facing outwardly, a normally open switch carried by the lamp and including a movable rest adapted to receive the arm of the operator for closing the switch and lighting the lamp and to support the arm in proper position for illuminating the hand extended.

2. A normally non-illuminating signal lamp, means for supporting the lamp upon the side of a vehicle in position to face outwardly from said side of the vehicle and to illuminate the hand when the arm is laterally extended, and operating means for illuminating the lamp and including a rest to receive the arm of the operator and adapted to be operated by the arm when swung outwardly to illuminate the signaling hand.

3. In combination with a vehicle, a signal lamp, a pair of spaced contacts for controlling the energizing of said lamp, a circuit closer including a bridging pin adapted to bridge said contacts, said circuit closer adapted to be operated for bridging said contacts under the weight of a driver's arm when extended laterally from the vehicle, and an expansion spiral spring connected to said circuit closer for returning it to its normal position when relieved of the weight of the driver's arm, a shoulder formed upon said circuit closer, a housing for said lamp, a shoulder upon said housing adapted to be engaged by the shoulder upon said circuit closer for limiting the circuit closing movement of the circuit closer.

4. In combination with a vehicle, a signal lamp, a pair of spaced contacts for controlling the energizing of said lamp, a circuit closer including a bridging pin adapted to bridge said contacts, said circuit closer adapted to be operated for bridging said contacts under the weight of a driver's arm when extended laterally from the vehicle, an expansion spiral spring connected to said circuit closer for returning it to its normal position when relieved of the weight of the driver's arm, a shoulder formed upon said circuit closer, a housing for said lamp, a shoulder upon said housing adapted to be engaged by the shoulder upon said circuit closer for limiting the circuit closing movement of the circuit closer, a reflector within said housing about said lamp, and a lens removably carried at the outer end of the housing.

SAMUEL JAMES SIBLEY.